United States Patent [19]

Soga

[11] 4,145,735
[45] Mar. 20, 1979

[54] MONITOR FOR PRIORITY LEVEL OF TASK IN INFORMATION PROCESSING SYSTEM

[75] Inventor: Hiromu Soga, Kitakyushu, Japan

[73] Assignee: Nippon Steel Corporation, Tokyo, Japan

[21] Appl. No.: 765,002

[22] Filed: Feb. 2, 1977

[51] Int. Cl.² .................. H04J 3/08; G06F 9/18; G05B 11/36
[52] U.S. Cl. ..................... 364/200; 179/15 AL; 340/147 LP
[58] Field of Search .............. 340/147 LP, 147 R; 179/15 AL, 15 A

[56] References Cited

U.S. PATENT DOCUMENTS

| B 496,500 | 2/1976 | Jones et al. | 179/15 AL |
| 3,700,820 | 10/1972 | Blasbalg et al. | 179/15 A |

OTHER PUBLICATIONS

E. J. Annunziata, et al., "Input/Output Module", *IBM Technical Disclosure Bulletin*, vol. 14, No. 1, Jun. 1971, pp. 264-268.

*Primary Examiner*—Donald J. Yusko
*Attorney, Agent, or Firm*—Wenderoth, Lind & Ponack

[57] ABSTRACT

The present invention is a monitor for the priority level of tasks in a computer in which priority levels are assigned to tasks in such a manner that a higher priority level is assigned with a shorter time. During the period when a task assigned with an optional priority level is processed, its processing time is measured and recorded by means of a level timer. In case a second task with a high priority level interrupts the first task and the processing is suspended, the measuring and recording of time are stopped, and the measured and recorded values are stored. When the processing of the second task is completed and the processing of the first task is started again, measuring and recording are started again from the stored values. When the processing time of the first task exceeds the processing time assigned to its priority level, the processing of the first task is suspended and a warning is issued.

5 Claims, 5 Drawing Figures

MONITOR FOR PRIORITY LEVEL OF TASK IN INFORMATION PROCESSING SYSTEM

BACKGROUND OF THE INVENTION

The present invention relates to a monitor for the priority level of tasks in an information processing system that executes a large number of coexisting programs.

In a computer system, having a large number of tasks to be processed independently, a task being the minimum unit of instructions to be operated in parallel, the concept of priority level is introduced. A task requiring emergency execution is assigned a high priority level, and when the processing is applied the task, a task assigned a lower priority is made to standby. Thus the task with the higher level is processed prior to the execution of the lower priority level tasks. However, in the case of a computer system having a process computer that controls one form of computation or one process, the matter relating to determination of the kind of priority level appropriate for a certain task can be studied and determined previously in design stage. However, for example, in the case of a computer system for large scale research laboratory (in this case, the system is called the LA system) where a large number of persons prepare programs independently from different viewpoint for processing by one computer, individuals tend to raise the priority levels at their own discretion so that their own work is completed. Of course, in this manner tasks assigned high priority levels are produced in excess, and those tasks interfere with each other which results in unsatisfactory performance of the system. On the other hand, some of the programs are frequently rewritten, and as a whole, the job of assigning an appropriate priority level to each program becomes rather difficult. Accordingly, when a conventional priority system is applied to the LA system without modification, it produces a condition in which nobody seems to know anything about the priority level assignment, and as a result, deterioration of the meaning and function of the original priority level system that executes an emergency task by assigning a higher priority level cannot be avoided.

Consequently, it is necessary that the concept of emergency be defined common to all of the programmers, but it is very difficult to indicate this to each programmer quantitatively. For example, in a FORTRAN program, even if the priority level is defined by the number of steps, the run time of the tasks will differ from each other, and also examination of CALL $L_n$ (subroutine instructing execution with n level) of the FORTRAN program relating to the level change scattering in the whole program cannot be actually made. Moreover, in the stage of program, it is extremely difficult to forecast the processing time.

SUMMARY OF THE INVENTION

The present invention has improved the foregoing problems in the information processing system composed of a multi-programming system.

An object of the present invention is to provide a monitor for the priority level of tasks in an information processing system wherein the CPU occupation time of a task in each priority level is limited and monitored whereby response time according to the priority of each level can be guaranteed.

Another object of the present invention is to provide a monitor for the priority level of tasks in an information processing system wherein the data to facilitate determination of the number of tasks of each priority level and the task processing time for each priority level can be collected, and assignment of priority levels and processing of priority levels can be performed in a fast, appropriate and rational mode.

In order to achieve the foregoing objects, the monitor for the priority level of tasks in an information processing system according to the present invention is characterized in that priority levels are assigned to tasks in such a manner that a higher priority level is coupled with a shorter time. During the period when a task assigned with an optional priority level is processed, its processing time is measured and recorded by means of a level timer. If a second task with a high priority level interrupts the first task and the processing is suspended, the measuring and recording of time are stopped, and the measured and recorded values are stored. When the processing of the second task is completed and the processing of the first task is started again, measuring and recording are again started from the stored values. When the processing time of the first task exceeds the processing time corresponding to its priority level, the processing of the first task is suspended and a warning is issued.

DESCRIPTION OF THE PREFERRED EMBODIMENTS

In the present invention, the positions or importance of the priority levels are classified according to the time required for processing tasks, and it is so designed that a task with higher priority level requires a shorter task processing time. A hard timer which is herein called a level timer is provided totally irrespective of the kinds of programs. The run time is classified into a plurality, for example, 8 levels according to the priority level, and the actual task run time is monitored on each level by means of the timer. The permissible time (set time) for each level is previously disclosed to each programmer (for example, as mean FORTRAN step number), and at the task run time, the level timer monitors the task run time. A program that runs over the permissible time is interrupted by the system which instead shifts to the processing of the next task waiting in line. In this arrangement, each programmer can receive the service of the computer impartially of nearly what is desired, and also the processing time at each level can almost be guaranteed.

A task assigned with a high priority which requires a longer time for processing is divided into a plurality each requiring only a tasks of short time. If this division is carried out, and where there are no other task with a higher priority level, the subject task will be continuously processed until it is completed. If there is another task with a higher priority level, that task interrupts but after the completion of its processing, the processing of the previous task is started again, and will be completed soon. If the processings are carried out as described in the foregoing, the significance of the priority levels almost completely maintained.

The second essential point of the present invention relates to a measuring device for the occupation time of the central processing unit CPU in each priority level, and as will be described hereinafter, it is represented by a level count timer. In general, not only in a LA but also in control computer, actual measurement of the performance of the system, especially, the operating ratio of the CPU in each priority level and operating ratio of the CPU of whole system provides important design data which bears extreme significance. As will be described hereinafter, by employing the techniques of the present invention, this function can be realized easly at low cost.

The present invention will be described in more detail in the following by reference to the accompanied drawings.

Figure 1:
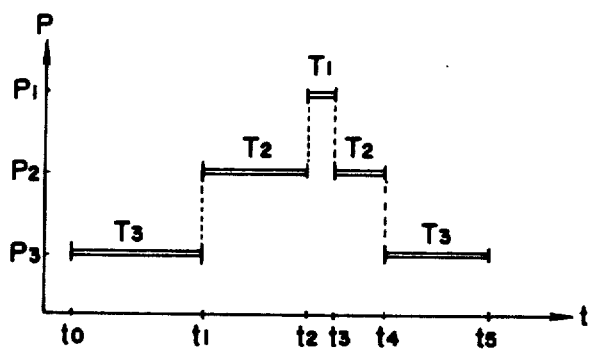
FIG. 1 is a drawing for illustrating the conditions where a task with a higher priority level interrupts a task being processed and then is processed, the condition being indicated by a graph of the relationship between the task processing time and the priority level.

FIG. 1 is a drawing for illustration of the condition where a task is executed to which the concept of priority levels is applied. The abscissa shows time t, and the ordinate shows the priority level P.

Now, when a task $T_3$ with a priority level $P_3$ generates an interrupt signal at time $t_0$ and the processing is started, and a task $T_2$ with priority level $P_2$ which is higher than said priority level $P_3$ generates an interrupt signal at time $t_1$, the processing of the task $T_3$ is suspended, and the processing of the task $T_2$ is started. In this condition, if a task $T_1$ with priority level $P_1$ which is higher than the priority level $P_2$ generates an interrupt signal at time $t_2$, the processing of the task $T_2$ is suspended, and instead, the processing of the task $T_1$ is started. When the processing of the task $T_1$ is completed at the time $t_3$, the processing of the task $T_2$ is started again, and when this processing is completed at time $t_4$, the processing of the initial task $T_3$ is started again, and when this processing is completed at time $t_5$, all the tasks are completely processed.

In the present invention, as described in the foregoing, the processing time $t_3-t_2$ of the task $T_1$ with the highest priority is set smaller than the processing time $(t_4-t_3) + (t_2-t_1)$, and the processing time $(t_5-t_4) + (t_1-t_0)$. The processing time $t_3-t_2$ of the task $T_1$ with the highest priority is monitored by a level timer, and if the processing time becomes longer than a predetermined time corresponding to the priority level, the processing of that task is suspended, a warning is issued and the processing of the task $T_2$ with a lower priority level is started again. Similarly for the task $T_2$ with the lower priority level, the level timer monitors the processing time, and if it exceeds a predetermined time corresponding to the priority level, the process consisting of suspension of processing, issuing a warning and starting the processing of a task with a lower priority level is carried out.

As will be obvious from the foregoing description, this level timer is set simultaneously with the start of processing of a task with a given priority level starts to count and continues its counting operation until the processing is completed or suspended. In case of suspension, it stores the measured value until it is started again, starts integration simultaneously with the restarting of the processing, generates an interrupt signal if the processing time exceeds the predetermined time during the period ranging from the start to the completion of processing, and causes the suspension of processing of the subject task and start of processing of the other task. Therefore, the level timer is required to perform the foregoing operations.

Figure 2:
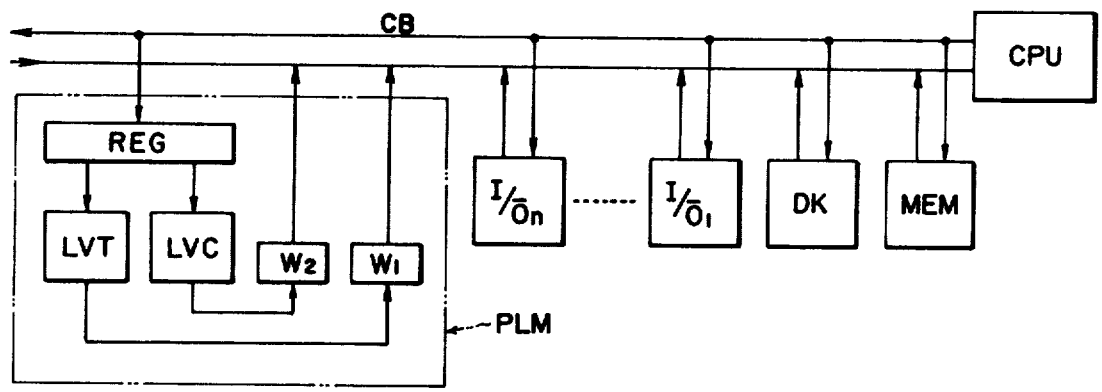
FIG. 2 is a block diagram showing an outline of the monitor according to the present invention.

FIG. 2 is a block diagram showing an outline of the monitor according to the present invention.

The CPU is connected to a memory MEM, a magnetic disk MK and various kinds of input/output units (I/O1 . . . I/On) through a common bus CB. On the extension of the CB, a priority level monitor PLM is connected.

The priority level monitor is primarily composed of a control register REG, a level timer LVT, a level counter LVC and interrupt signal generators $W_1$, $W_2$.

The task to be processed by the information processing system is stored in the memory MEM, secures a right of execution, and also obtains a right of occupying CPU, but its permissible occupation time is determined by the bit number of the counter CTR constituting the level timer to be described hereinafter which corresponds to the priority level assigned to the task.

The control register REG is connected to the CPU by means of the common bus CB and a gate control signal corresponding to the priority level of the task being processed in the CPU is received from the CPU by means of the common bus CB.

The level timer LVT and the level counter LVC are connected to an output of the control register REG. The level timer LVT measures and records the processing time of the task being processed in the CPU with respect to each task on the basis of the control signal from the control register REG, and if the processing time of a task exceeds the permissible CPU occupation time determined by the bit number of the CTR, a count overflow signal is generated. The interrupt signal generator $W_1$ is connected to an output of the level timer LVT, and the interrupt signal is generated by reception of the count overflow signal and is transmitted to the CPU by means of the common bus CB.

If the processing of each task is completed within the permissible CPU occupation time, the content of the corresponding CTR is cleared, and accordingly, a count overflow signal is not generated and as a result, an interrupt signal is not generated.

The level counter LVC is also connected to an output of the control register REG, and a gate of level counter (to be described hereinafter) corresponding to the priority level assigned to the task being processed in the CPU is controlled by the control signal from the control register REG, thus the CPU occupation time is measured and recorded.

However, the level counter LVC is different from the level timer LVT in that the content of counter is not cleared by the completion of processing of each task. Whenever a particular priority level is used, the corresponding counter content is added and is integrated so that when the integrated value of the CPU occupation time exceeds the given counter capacity, a count overflow signal is always generated. The interrupt signal generator $W_2$ is connected to an output of the level counter LVC, an interrupt signal is generated by the reception of the count overflow signal, and the interrupt signal is transmitted to the CPU by means of the common bus CB.

Figure 3:
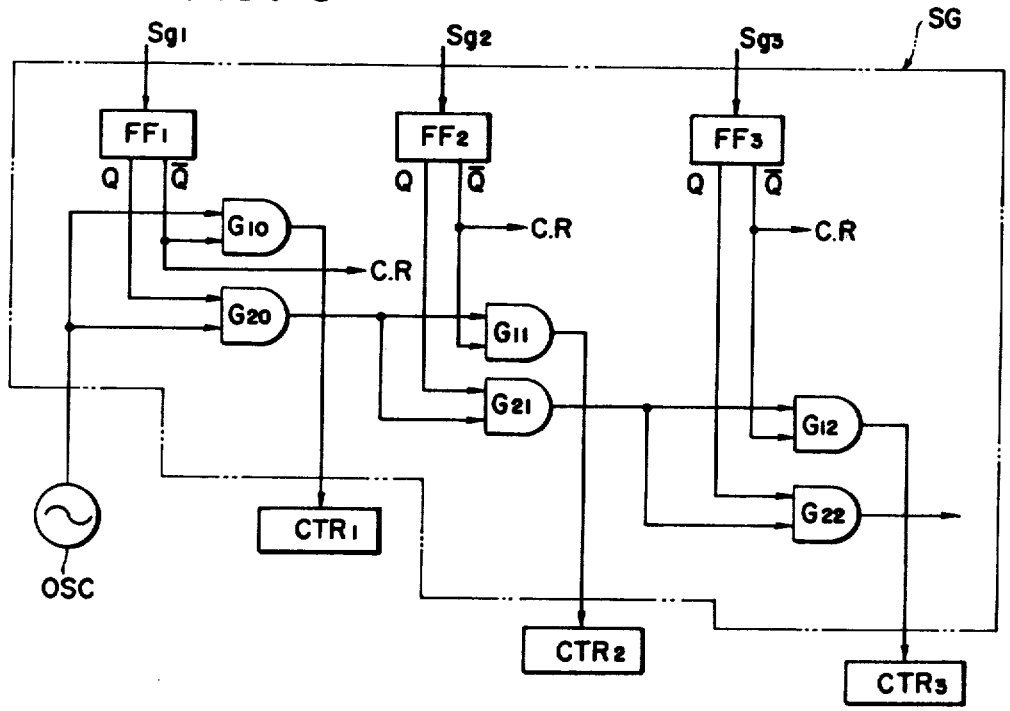
FIG. 3 is a block diagram showing one example of a level timer constituting a part of the monitor shown in FIG. 2.

FIG. 3 shows an embodiment of the level timer suitable for performing the time measuring action mentioned in the foregoing. In this drawing, OSC denotes an oscillator that generates a clock pulse of, for example, 16 KHz, and is provided with a VCO structure (voltage control variable frequency oscillator) the frequency of which can be varied in a certain range. $CTR_1$, $CTR_2$, $CTR_3$ denote counters constituting a timer to monitor the processing time of priority levels $P_1$, $P_2$, $P_3$, and are connected to the oscillator OSC by means of AND gates $G_{10}$, $G_{20}$, $G_{11}$, $G_{20}$, $G_{21}$ and $G_{12}$. Moreover, a counter (not shown) corresponding to a task with low priority level is connected to the oscillator OSC by means of AND gates $G_{20}$, $G_{21}$ and $G_{22}$. $FF_1$, $FF_2$, $FF_3$ denote flip flop circuits to switch the AND gates $G_{10}$, $G_{20}$, $G_{11}$, $G_{21}$, $G_{12}$ and $G_{22}$ by their terminals Q and $\bar{Q}$, and their gate control inputs $Sg_1$, $Sg_2$, $Sg_3$ are received according to the priority level of the task to be processed.

Now the operation of this circuit will be described wherein the flip flop circuits $FF_1$–$FF_3$ output "1" to their Q terminal and "0" to their $\bar{Q}$ terminal in the condition where no tasks with any priority levels are executed. This opens the gates $G_{20}$, $G_{21}$ and $G_{22}$, closes the gates $G_{10}$, $G_{11}$ and $G_{12}$, and makes the clock pulse from the oscillator OSC unable to entering any counter and merely discards it. In such a condition, for example, if a task with priority level $P_2$ is executed, the flip flop circuit $FF_2$ is triggered, the output of the $\bar{Q}$ terminal is made "1" and the output of the Q terminal is made "0", then the clock pulse flows into the counter $CTR_2$. When the task $T_1$ with priority level "1" generates an interrupt signal while the task with priority level $P_2$ is processed, the flip flop circuit $FF_1$ is switched over, the output of the Q terminal is made "0" and the output of the $\bar{Q}$ terminal is made "1",whereby the counter $CTR_2$ suspends counting, and instead, the counter $CTR_1$ starts to count. When the processing of the task $T_1$ is completed, the flip flop circuit $FF_1$ is triggered again, and the output of the Q terminal is made "1", and the output of the $\bar{Q}$ terminal is made "0". As the result, the inflow of the clock pulses into the counter $CTR_1$ is stopped, and instead, the inflow of the clock pulse into the counter $CTR_2$ is started again. As previously stated, the level timer generates an interrupt signal whenever a task exceeds the permissible CPU occupation time corresponding to its assigned priority level. The capacities of counters $CTR_1$, $CTR_2$ and $CTR_3$ are set in conjunction with the frequency of the clock pulses from oscillator OSC so that the counters generate a count overflow signal when the corresponding priority level permissible CPU occupation time is exceeded.

Figure 4:
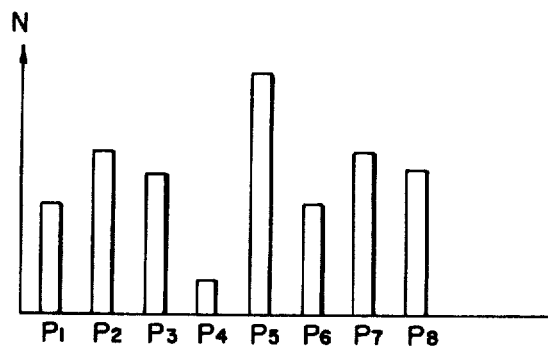
FIG. 4 is a histogram showing one example of the frequency of use of each priority level.

The foregoing gate circuit group resembles an arrangement wherein a plurality of containers are sequentially arranged along an inclined passage through which water flows and a valve is mounted on the inlet of each container. Namely, in such a device, if all the valves are closed, then the water merely flows down along the inclined passage. If an optional valve is opened, the water flows into the container mounted with the opened valve and the water no longer flows downstream. Such a device performs an operation similar to that of the gate and counter group shown in FIG. 3. Accordingly, the device shown in FIG. 3 can be called a stream gate circuit. The level counter LVC can also be embodied as illustrated in FIG. 3. The level counter LVC differs from the level timer LVT in the resetting of counters $CTR_1$, $CTR_2$ and $CTR_3$. The clock pulses are supplied to the counters by means of the stream gate circuit, and the counters do not reset even if the task with the corresponding priority level is completed or suspended. If it overflows, the counter starts to count from the beginning. When the number of times of the overflows is counted, this number of overflows subsequently shows the frequency of use of the priority level. Accordingly, such a counter can be called the level count timer, and the integrated value of the number of overflows constitutes a histogram as shown in FIG. 4. The ordinate of this drawing shows the number of overflows N and the abscissa shows each task of priority levels $P_1$–$P_3$. The histogram mentioned in the foregoing clearly shows the length of available time of any priority level at a glance.

This information provides data for the design of a system such as the determination of the number of levels or the permissible time in one computer system or the operating condition of a system rather than its availability by users directly. Also, as since it is possible to add on an operating system and interface monitor, data relating to the operating ratio of the monitor in the whole system can be obtained.

In the conventional computer system for LA (for laboratory information), generally this kind of data is not available, and if such data were obtained, it can be expected that the data would become a precious information for the future maintenance of the system.

For the level counter LVC, the stream gate circuit and clock can be similar to the level timer LVT. The number of pulses until overflow, namely, the capacity of the counters $CTR_1$, $CTR_2$ and $CTR_3$ can be appropriately determined by taking the circuit structure and precision of measurement into consideration, but one example of the capacity is shown in the following table.

| Level | Permissible value of level timer (ms) | LVC (ms) |
| --- | --- | --- |
| OS | — | 128 |
| $F_3$ | — | 128 |
| $L_1$ | 1 | 128 |
| $L_2$ | 4 | 512 |
| $L_3$ | 16 | 2,048 |
| $L_4$ | 64 | 2,048 |
| $L_5$ | 256 | 2,048 |
| $L_6$ | 1,024 | 2,048 |
| $L_7$ | 4,096 | 2,048 |
| P | 16,384 | 2,048 |

$F_3$ in the table denotes the interface monitor that is the control intermediary between the operating system OS of the computer and the user programs, and $L_1$–$L_7$, and P denote 8 priority levels assigned to the users (programmers). Also LVC denotes the level counter. As shown in the table, the priority level is classified into 8 distinct time lengths between 1 ms–16384 ms, and the capacity of the level count timer is classified into 3 kinds of 128 ms, 512 ms, 2048 ms.

Figure 5:
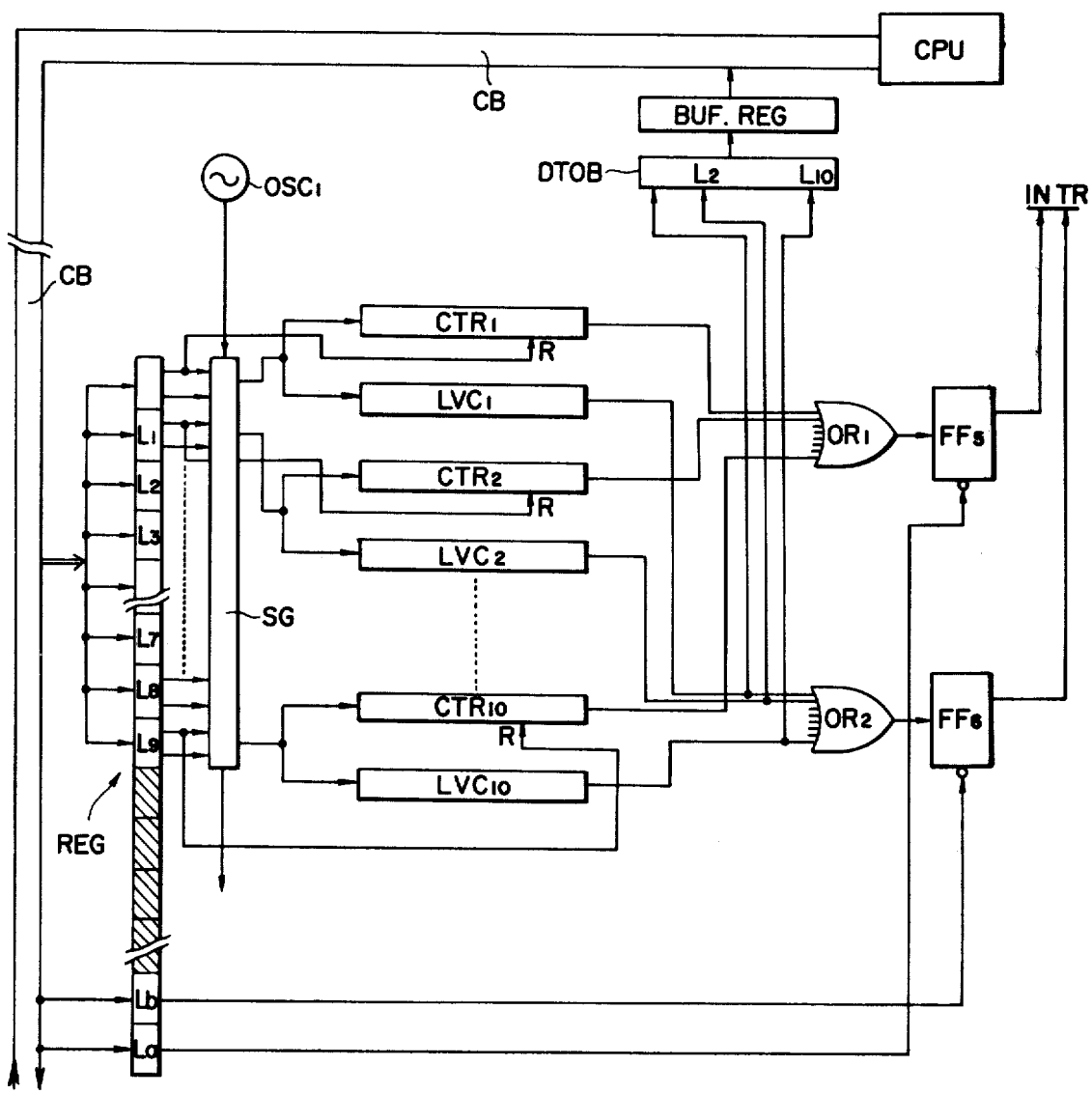
FIG. 5 is a block diagram showing one example of the monitor according to the present invention.

FIG. 5 shows a drive circuit for the level timer LVT and the level counter LVC. In the drawing, $CTR_1$–$CTR_{10}$ denote counters constituting the level timer LVT, and $LVC_1$–$LVC_{10}$ denote counters constituting the level counter LVC. In this example, 10 priority levels are provided and therefore 10 counters are provided. $OSC_1$ denotes an oscillator to supply clock pulses to the counters, and SG denotes a stream gate circuit as mentioned in the foregoing. The switching of the stream gate circuit is controlled by the register REG, and the data from the CPU are applied to the register through the common bus CB. $OR_1$ and $OR_2$ denote OR gates. The overflow pulses of the counters $CTR_1$-$CTR_{10}$ and $LVC_1$-$LVC_{10}$ are applied to $OR_1$ and $OR_2$, respectively, for triggering the flip flops $FF_5$, $FF_6$. The overflow pulses of the counters $LVC_1$-$LVC_{10}$ are converted into binary coded digits by means of DTOB (decimal-binary converting circuit), and are read out by the data bus through BUF.REG (buffer register for readout).

The operation of the circuit will be described below. As mentioned in the foregoing, the control data is transmitted to the register REG according to the priority of the task to be executed, the designated stream gate SG is opened, the clock pulse from 16 KHz oscillator $OSC_1$ is applied to the counters, for example, $CTR_1$ and $LVC_1$, and the time measurement is carried out while the task is processed. The counter $CTR_1$ does not overflow if the task is processed completely within the set time according to the priority level, and simultaneously with the completion of processing, the counter $CTR_1$ receives a reset pulse R and is reset. However, when a long time is required for the processing of the task, the counter $CTR_1$ overflows and it sets the flip flop $FF_5$ through the OR gate $OR_1$ and generates an interrupt signal INTR.

The counter $LVC_1$ calculates the time processing clock whenever the task or a task having the same priority level appearing thereafter is processed without being reset in the middle, and in the meantime overflow of counter LVC, is effected. An overflow pulse triggers the flip flop $FF_6$ through the OR gate $OR_2$, and generates an interrupt signal INTR, and writes "1" in the column corresponding to the DTOB, namely, in this example, the $L_1$. The serial number of the counter that generates the interrupt signal is transmitted to the CPU through the common bus CB from the data bus by means of the DTOB and the BUF.REG. The foregoing process is applied to the other counters $CTR_2$-$CTR_{10}$ and $LVC_2$-$LVC_{10}$.

The columns $L_a$, $L_b$ of the control register REG store the signal for clearing the interrupt signal. The column with the oblique shading is a blank column.

In the embodiment of FIG. 5, a large number of counters $CTR_1$, $LVC_1$ are provided according to the number of priority levels, but the counters are employed in common for each level, and the result of calculations is stored in the memory provided for each priority level, and it is taken out according to requirement and they may be integrated.

As described in details in the foregoing, it is obvious that according to the present invention, the assignment of priority levels and the availability condition are extremely rational and the computer service can be uniformly made available to each user, and therefore it contributes greatly in the rational, efficient application of the large scale computer system wherein a large number of independent tasks are conjectured.

What is claimed is:

1. In a data processing where a number of tasks share a central processing unit according to a plurality of priority levels, a priority level monitor comprising:
    a control register coupled to said central processing unit for receiving from said central processing unit signals indicating the beginning of the execution of a task, the completion of the execution of that task and the priority level associated with that task and for storing said signals;
    a priority level timer connected to said control register for measuring the execution time of each task processed by said central processing unit and for generating an overflow signal when the execution time of a task exceeds a predetermined permissible execution time allowed to tasks having the priority level of said task; and
    an interrupt signal generator connected to said priority level timer and said central processing unit for generating an interrupt signal and transmitting said interrupt signal to said central processing unit when said priority level timer generates said overflow signal, whereby said apparatus monitors the execution time of tasks assigned to each priority level and causes a task to be aborted when the execution time of the task exceeds a predetermined permissible execution time allowed to tasks of that priority level.

2. A priority level monitor as claimed in claim 1, wherein said control register further comprises an interrupt clear signal generating means for generating an interrupt clear signal when said central processing unit resumes execution after an interrupt; said interrupt signal generator is further connected to said interrupt clear signal generating means; and said priority level timer comprises:
    a clock pulse generator for generating clock pulses;
    a plurality of priority level execution time measurement circuits each corresponding to one of the plurality of priority levels having a clock pulse input terminal for receiving clock pulses, a clock pulse output terminal for producing clock pulses, a flip-flop circuit connected to said control register for assuming a first state during the execution of a task havig the corresponding priority level and for assuming a second state upon completion of a task having the corresponding priority level, a first AND gate having a first input connected to said clock pulse input terminal, a second input connected to said flip-flop circuit, and an output for coupling the signals received on said first input to said output when said flip-flop circuit is in said first state, a counter connected to said output of said first AND gate for producing said overflow signal when a predetermined number of clock pulses are received, and a second AND gate having a first input connected to said clock pulse input terminal, a second input connected to said flip-flop circuit, and an output connected to said clock pulse output terminal for coupling the signals received on said first input to said clock pulse output terminal when said flip-flop circuit is in said second state, said priority level execution time measurement corresponding to the highest priority level having said clock pulse input terminal connected to said clock pulse generator and said priority level execution time measurement circuits corresponding to lower priority levels having said clock pulse input terminal connected to said clock pulse output terminal of said priority level execution time measurement circuit corresponding to the next higher priority; and wherein said interrupt signal generator comprises:
    an OR circuit having a plurality of inputs one connected to each of said counters of said priority level execution time measuring circuit for producing an OR output signal when any of said counters of said priority level execution time measuring circuits produce said overflow signal; and a flip-flop circuit connected to said OR circuit and said interrupt clear signal generating means for assuming a first state and generating said interrupt signal upon receiving said OR output signal and for assuming a second state and ceasing generation of said interrupt signal upon receiving said interrupt clear signal.

3. A priority level monitor as claimed in claim 1, wherein said control register further comprises:

a priority level counter clearing means connected to said counters of said priority level execution time measurement circuits for resetting said counter of said priority level execution time measurement circuit when a task having the corresponding priority level is completed.

4. A priority level monitor as claimed in claim 1, further comprising:

a total execution time measuring means connected to said control register for measuring the total execution time of tasks in each priority level and for producing a timing signal whenever the execution time of a particular priority level exceeds an integral multiple of a corresponding predetermined period; and a timing interrupt signal generator connected to said total execution time measuring means and the central processing unit for generating a timing interrupt signal and transmitting said timing interrupt signal to the central processing unit when said total execution time measuring means generates said timing signal.

5. A priority level monitor as claimed in claim 3, wherein said total execution time measuring means comprises:

a plurality of level counters each corresponding to one of the priority levels and one of said priority level execution time measurement circuits connected to the output of said first AND gate for counting the clock pulses received therefrom and producing said timing signal whenever an integral multiple of a predetermined number of clock pulses are received; and said timing interrupt signal generator comprises:

an OR circuit having a plurality of inputs one connected to each of said level counters of said total execution time measuring means for prodcuing an OR output signal when any of said level counters of said total execution time measuring means produces a timing signal; and a flip-flop circuit connected to said OR circuit and said interrupt clear signal generating means for assuming a first state and generating said timing interrupt signal upon receiving said OR output signal and for assuming a second state and ceasing generation of said timing interrupt signal upon receiving said interrupt clear signal.

* * * * *